United States Patent
Tomita et al.

(10) Patent No.: US 9,464,598 B2
(45) Date of Patent: Oct. 11, 2016

(54) EXHAUST GAS COOLING DEVICE

(75) Inventors: Takashi Tomita, Toyota (JP); Toru Ikeda, Aichi-ken (JP); Isao Kuroyanagi, Anjo (JP); Takayuki Hayashi, Nagoya (JP); Takeshi Iguchi, Gifu (JP); Takao Ikeda, Okazaki (JP); Ryoichi Sanada, Obu (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 191 days.

(21) Appl. No.: 14/233,437

(22) PCT Filed: Jul. 19, 2012

(86) PCT No.: PCT/IB2012/001401
§ 371 (c)(1),
(2), (4) Date: Apr. 24, 2014

(87) PCT Pub. No.: WO2013/011369
PCT Pub. Date: Jan. 24, 2013

(65) Prior Publication Data
US 2015/0075504 A1   Mar. 19, 2015

(30) Foreign Application Priority Data
Jul. 20, 2011   (JP) .................. 2011-158763

(51) Int. Cl.
*F28F 11/00*   (2006.01)
*F02M 25/07*   (2006.01)
*F28F 9/18*   (2006.01)
(Continued)

(52) U.S. Cl.
CPC ............ *F02M 25/0734* (2013.01); *F28D 7/16* (2013.01); *F28D 21/0003* (2013.01); *F28F 9/182* (2013.01); *Y02T 10/121* (2013.01)

(58) Field of Classification Search
CPC .................. F02M 25/0734; F02M 25/0737; F28D 21/0003; F28D 7/16; F28F 9/182
See application file for complete search history.

(56) References Cited

U.S. PATENT DOCUMENTS

| 3,473,215 | A | | 10/1969 | Stevens | |
|---|---|---|---|---|---|
| 4,529,034 | A | * | 7/1985 | Saperstein | ........... B23K 1/0012 165/134.1 |
| 5,327,959 | A | * | 7/1994 | Saperstein | .......... F28D 1/05391 165/153 |

(Continued)

FOREIGN PATENT DOCUMENTS

| CN | 1456796 | | 11/2003 |
|---|---|---|---|
| DE | 2122179 | A | 11/1972 |

(Continued)

*Primary Examiner* — Marguerite McMahon
*Assistant Examiner* — Tea Holbrook
(74) *Attorney, Agent, or Firm* — Finnegan, Henderson, Farabow, Garrett & Dunner, LLP

(57) ABSTRACT

An exhaust gas cooling device, which cools exhaust gas from an internal combustion engine mounted on a vehicle through heat exchange between the exhaust gas and a coolant, includes: a plurality of tubes through which the exhaust gas flows; a tubular shell which houses the plurality of tubes and is configured to allow the coolant to flow therethrough; and a header plate disposed at an end portion in the shell to prevent the coolant from flowing out of the shell. The header plate includes support holes in which end portions of the plurality of tubes are fitted and supported, and each of axial end faces of the plurality of tubes is located in the corresponding support hole at a position between both ends of the header plate in a thickness direction of the header plate.

8 Claims, 9 Drawing Sheets

(51) Int. Cl.
*F28D 21/00* (2006.01)
*F28D 7/16* (2006.01)

(56) References Cited

U.S. PATENT DOCUMENTS

| | | | |
|---|---|---|---|
| 5,423,112 A * | 6/1995 | Murphy | B23K 1/0012 228/183 |
| 5,787,973 A * | 8/1998 | Kado | F28F 9/182 165/153 |
| 2002/0162651 A1* | 11/2002 | Nakagome | F28F 9/182 165/158 |
| 2005/0167091 A1* | 8/2005 | Juschka | F28D 7/1684 165/173 |
| 2006/0130818 A1* | 6/2006 | Igami | F28D 1/047 123/568.12 |
| 2006/0231243 A1* | 10/2006 | Sugihara | F28D 7/0066 165/158 |
| 2007/0017489 A1 | 1/2007 | Kuroki et al. | |
| 2007/0246207 A1* | 10/2007 | Nakamura | F28D 7/1684 165/173 |
| 2011/0168370 A1* | 7/2011 | Garret | F28D 7/1684 165/158 |
| 2011/0308778 A1 | 12/2011 | Tsuda et al. | |

FOREIGN PATENT DOCUMENTS

| | | |
|---|---|---|
| DE | 3015278 A1 | 10/1981 |
| DE | 4309360 A1 | 9/1994 |
| FR | 2 888 887 | 1/2007 |
| JP | 61-110979 | 7/1986 |
| JP | 2001-182627 | 7/2001 |
| JP | 2002-46485 | 2/2002 |
| JP | 2003-328863 | 11/2003 |
| JP | 2004-12105 | 1/2004 |
| JP | 2004-177058 | 6/2004 |
| JP | 2010-190064 | 2/2010 |
| JP | 2010-196679 A | 9/2010 |

* cited by examiner

5A

EXHAUST GAS COOLING DEVICE

CROSS-REFERENCE TO RELATED APPLICATIONS

This application is a national phase application of International Application No. PCT/IB2012/001401, filed Jul. 19, 2012, and claims the priority of Japanese Application No. 2011-158763, filed Jul. 20, 2011, the content of both of which is incorporated herein by reference.

BACKGROUND OF THE INVENTION

1. Field of the Invention

The present invention relates to an exhaust gas cooling device which cools exhaust gas from an internal combustion engine mounted on a vehicle through heat exchange between the exhaust gas and a coolant. More specifically, the present invention relates to an Exhaust Gas Recirculation (EGR) cooler.

2. Description of the Related Art

Technologies for preventing corrosion of components of an exhaust gas cooling device, such as an EGR cooler, caused by condensed water are conventionally known.

For example, an EGR device in which the bottom of the shell of an EGR cooler is inclined at an angle θ (at least 5°) so that the exhaust gas inlet side of the EGR cooler is lower than the other side is disclosed (refer to Japanese Patent Application Publication No. 2003-328863 (JP 2003-328863 A)). According to the EGR device, the condensed water which is generated in the exhaust gas flows smoothly from the exhaust gas outlet side to the exhaust gas inlet side, and harmful sulfuric acid in the condensed water is decomposed and vaporized by the high-temperature exhaust gas. Thus, the EGR cooler, EGR piping or EGR valve are unlikely to be corroded.

However, in the EGR device that is disclosed in JP 2003-328863 A, tubes through which the exhaust gas flows are secured to header plates with their both ends extending through the header plates (refer to paragraph [0005] of JP 2003-328863 A). Thus, condensed water may accumulate along the side surfaces of the header plates between the outer peripheral surfaces of the tubes that protrude from the header plates (refer to FIG. 9A).

When condensed water accumulates as described above, the tubes or the header plate may be corroded by the condensed water.

SUMMARY OF THE INVENTION

The present invention provides an exhaust gas cooling device in which condensed water is prevented from accumulating between outer peripheral surfaces of tubes.

An aspect of the invention relates to an exhaust gas cooling device which cools exhaust gas from an internal combustion engine mounted on a vehicle through heat exchange between the exhaust gas and a coolant. The exhaust gas cooling device includes: a plurality of tubes through which the exhaust gas flows; a tubular shell which houses the plurality of tubes and is configured to allow the coolant to flow therethrough; and a header plate disposed at an end portion in the shell to prevent the coolant from flowing out of the shell. The header plate includes support holes in which end portions of the plurality of tubes are fitted and supported, and each of axial end faces of the plurality of tubes is located in the corresponding support hole at a position between both ends of the header plate in a thickness direction of the header plate.

In the exhaust gas cooling device with the above configuration, because each of the axial end faces of the plurality of tubes is located in the corresponding support hole at a position between the both ends of the header plate in the thickness direction of the header plate, each of the axial end faces of the plurality of tubes does not protrude from the corresponding support hole of the header plate. Thus, condensed water is prevented from accumulating between the outer peripheral surfaces of the tubes.

In the exhaust gas cooling device according to the above-described aspect of the invention, the header plate may include movement restricting portions which contact the axial end faces of the plurality of tubes to restrict the plurality of tubes from moving axially.

In the exhaust gas cooling device with the above configuration, because the header plate includes the movement restricting portions which contact the axial end faces of the plurality of tubes to restrict the plurality of tubes from moving axially, the plurality of tubes are prevented from moving axially.

In the exhaust gas cooling device according to the above-described aspect of the invention, each of the movement restricting portions may be constituted by a wall member that extends in a direction perpendicular to the thickness direction of the header plate, in the corresponding support hole.

In the exhaust gas cooling device with the above configuration, because each of the movement restricting portions is constituted by the wall member that extends in the direction perpendicular to the thickness direction of the header plate, in the corresponding support hole, the plurality of tubes are reliably prevented from moving axially, with the simple structure.

In the exhaust gas cooling device according to the above-described aspect of the invention, each of the movement restricting portions may have a height in the direction perpendicular to the thickness direction of the header plate, the height being equivalent to a thickness of each of the tubes.

In the exhaust gas cooling device with the above configuration, each of the movement restricting portions has a height in the direction perpendicular to the thickness direction of the header plate, the height being equivalent to the thickness of each of the tubes. Therefore, the internal surface of each of the movement restricting portions is flush with the internal surface of the corresponding one of the plurality of tubes. Thus, condensed water is prevented from accumulating between each of the movement restricting portions and the corresponding tube.

In the exhaust gas cooling device according to the above-described aspect of the invention, the shell may be inclined with respect to a horizontal axis of the vehicle, and the shell may be bent at a lower end portion in a higher side of the shell to extend along an end face of the header plate, the end face being away from the tubes.

In the exhaust gas cooling device with the above configuration, because the shell is inclined with respect to the horizontal axis of the vehicle, and the shell is bent at the lower end portion in the higher side of the shell to extend along the end face of the header plate, the end face being away from the tubes, condensed water is prevented from accumulating between the shell and the end face of the header plate, the end face being away from the tubes.

In other words, the condensed water that is generated between the shell and the end face of the header plate, which is away from the tubes, flows to a lower end portion in a lower side of the shell through the tube located at the lowermost position among the plurality of tubes, and the condensed water is vaporized upon exposure to the exhaust gas. Thus, condensed water is prevented from accumulating between the shell and the end face of the header plate, the end face being away from the tubes.

In the exhaust gas cooling device according to the above-described aspect of the invention, the shell may be bent such that a position of an upper surface of a lower part of the tube located at a lowermost position among the plurality of tubes substantially coincides with a position of an internal surface of the shell.

In the exhaust gas cooling device with the above configuration, because the shell is bent such that the position of the upper surface of the lower part of the tube located at the lowermost position among the plurality of tubes substantially coincides with the position of the internal surface of the shell, the flow of exhaust gas through the tube is prevented from being interfered with by the shell.

In the exhaust gas cooling device according to the above-described aspect of the invention, the shell may be inclined with respect to a horizontal axis of the vehicle, and the shell may include a tubular exhaust pipe which is provided at an end portion in a higher side of the shell, and through which the exhaust gas flows. The header plate may include a tubular extended portion that extends from an outer peripheral portion of the header plate toward a side away from the tubes, and an end portion of the exhaust pipe, which is located on a side of the tubes, may be fitted in and fixed in the extended portion.

In the exhaust gas cooling device with the above configuration, the shell is inclined with respect to the horizontal axis of the vehicle, and the shell includes the tubular exhaust pipe which is provided at the end portion in the higher side of the shell, and through which the exhaust gas flows. The header plate includes the tubular extended portion that extends from the outer peripheral portion of the header plate toward the side away from the tubes, and the end portion of the exhaust pipe, which is located on the side of the tubes, is fitted in and fixed in the extended portion. Therefore, condensed water is prevented from accumulating between the shell and the end face of the header plate, the end face being away from the tubes.

In other words, the condensed water that is generated between the shell and the end face of the header plate, which is away from the tubes, flows to the lower end portion in the lower side of the shell through the tube located at the lowermost position among the plurality of tubes, and the condensed water is vaporized upon exposure to the exhaust gas. Thus, the condensed water is prevented from accumulating between the shell and the end face of the header plate, the end face being away from the tubes.

In the exhaust gas cooling device according to the above-described aspect of the invention, the exhaust pipe may be disposed such that a position of an upper surface of a lower part of the exhaust pipe substantially coincides with a position of an upper surface of a lower part of the tube located at a lowermost position among the plurality of tubes, in a top-bottom direction.

In the exhaust gas cooling device with the above configuration, because the exhaust pipe is disposed such that the position of the upper surface of the lower part of the exhaust pipe substantially coincides with the position of the upper surface of the lower part of the tube located at the lowermost position among the plurality of tubes, in the top-bottom direction, the flow of exhaust gas through the tube is prevented from being interfered with by the exhaust pipe. Also, condensed water is prevented from accumulating between the upper surface of the lower part of the exhaust pipe and the upper surface of the lower part of the tube located at the lowermost position among the plurality of tubes.

In the exhaust gas cooling device according to the above-described aspect of the invention, the header plate may be made of aluminum or a resin.

In the exhaust gas cooling device with the above configuration, because the header plate is made of aluminum or a resin, the thickness of the header plate can be made greater (for example, 3 mm) than that of a conventional header plate. Thus, the movement restricting portions can be formed easily.

The conventional header plate is made of stainless steel (such as SUS304), and therefore, the thickness (1 mm, for example) of the conventional header plate cannot be increased because of weight limitation. In contrast, because the header plate is made of aluminum or a resin, the thickness of the header plate can be increased (to 3 mm, for example), and therefore, the movement restricting portions can be formed easily.

In the exhaust gas cooling device according to the above aspect of the present invention, because each of the axial end faces of the plurality of tubes is located in the corresponding support hole at a position between the both ends of the header plate in the thickness direction of the header plate, each of the axial end faces of the plurality of tubes does not protrude from the corresponding support hole of the header plate. Thus, condensed water is prevented from accumulating between the outer peripheral surfaces of the tubes.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Description is hereinafter made of embodiments of the present invention with reference to the drawings.

(Configuration of Internal Combustion Engine System 100)

Figure 1:
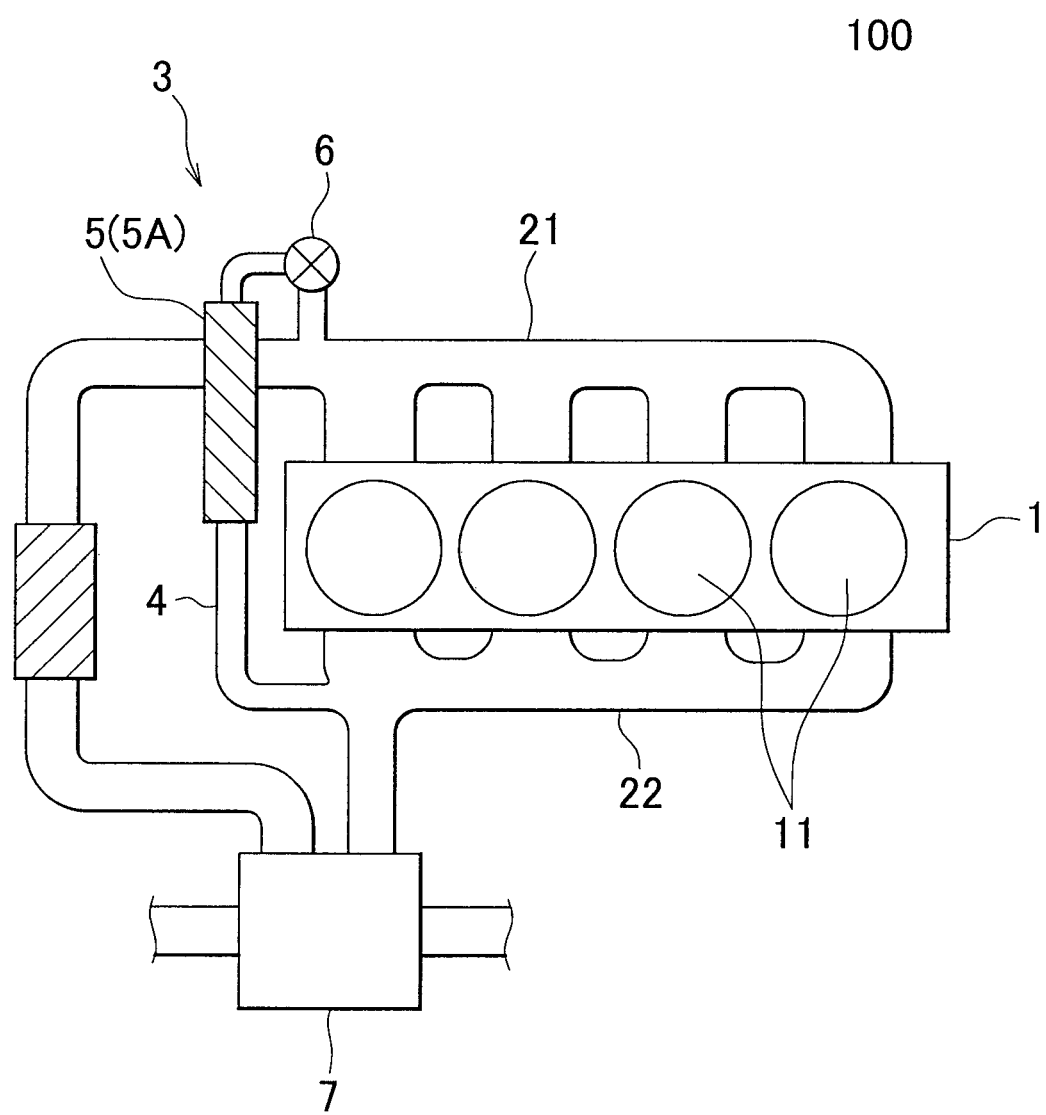
FIG. 1 is a conceptual diagram that illustrates one example of an internal combustion engine system to which an EGR cooler according to embodiments of the present invention is applied.

FIG. 1 is a conceptual diagram that illustrates one example of an internal combustion engine system 100 to which an EGR cooler according to embodiments of the present invention is applied. The general configuration of the internal combustion engine system 100 is first described below with reference to FIG. 1. An internal combustion engine system 100 that is shown in FIG. 1 includes an engine 1, an intake manifold 21, an exhaust manifold 22, an exhaust recirculation system 3, and a turbocharger 7. The engine 1 may be regarded as the "internal combustion engine" of the present invention.

The engine 1 is configured as an in-line four-cylinder gasoline engine. The engine 1 includes a cylinder block and a cylinder head, and four combustion chambers 11 are formed in the cylinder block. The cylinder head has an intake port through which intake air is supplied into the combustion chamber 11 and an exhaust port through which the exhaust gas that is generated in the combustion chamber 11 is discharged to the outside. While a case where the engine 1 is an in-line four-cylinder gasoline engine is described in this embodiment, the engine 1 may be a different kind of engine, such as a diesel engine, and the type or the number of cylinders of the engine 1 may be different.

An intake passage is connected to the intake port of the cylinder head of the engine 1 via the intake manifold 21. An exhaust passage is connected to the exhaust port of the cylinder head of the engine 1 via the exhaust manifold 22.

The exhaust recirculation system 3 returns the exhaust gas that is discharged from the engine 1 into the exhaust passage through the exhaust manifold 22 to the intake passage as Exhaust Gas Recirculation (EGR) gas, to decrease the combustion temperature to reduce NOx emission. In the exhaust recirculation system 3, the EGR gas is returned to the intake passage through an exhaust recirculation passage 4 that connects the exhaust passage and the intake passage.

An EGR cooler 5 that cools the EGR gas through heat exchange between a coolant and the EGR gas is interposed in the exhaust recirculation passage 4. The EGR gas is cooled in the EGR cooler 5 when returned from the exhaust passage into the intake passage through the exhaust recirculation passage 4. The EGR cooler 5 may be regarded as the "exhaust gas cooling device" according to the present invention. The EGR cooler 5 is inclined with respect to an horizontal axis of the vehicle, and a case where the downstream side (the EGR valve 6-side) of the EGR cooler 5 is located higher than the upstream side (the exhaust passage-side) thereof with respect to the flow of EGR gas through the EGR cooler 5 is herein described.

In addition, an EGR valve 6 is provided downstream of the EGR cooler 5 in the exhaust recirculation passage 4. The EGR valve 6 is a valve that adjusts the amount of exhaust gas that is recirculated from the exhaust passage to the intake passage through the exhaust recirculation passage 4. The opening of the EGR valve 6 is adjusted based on a command from an Electronic Control Unit (ECU) not shown.

The turbocharger 7 includes a turbine and a compressor which are connected by a turbine shaft for rotation together. When the turbine is rotated by the energy of the exhaust gas, the rotational force of the turbine is transmitted to the compressor through the turbine shaft, whereby the compressor is rotated to perform a supercharging operation.

(Configuration of Conventional EGR Cooler 5B)

Figure 7:
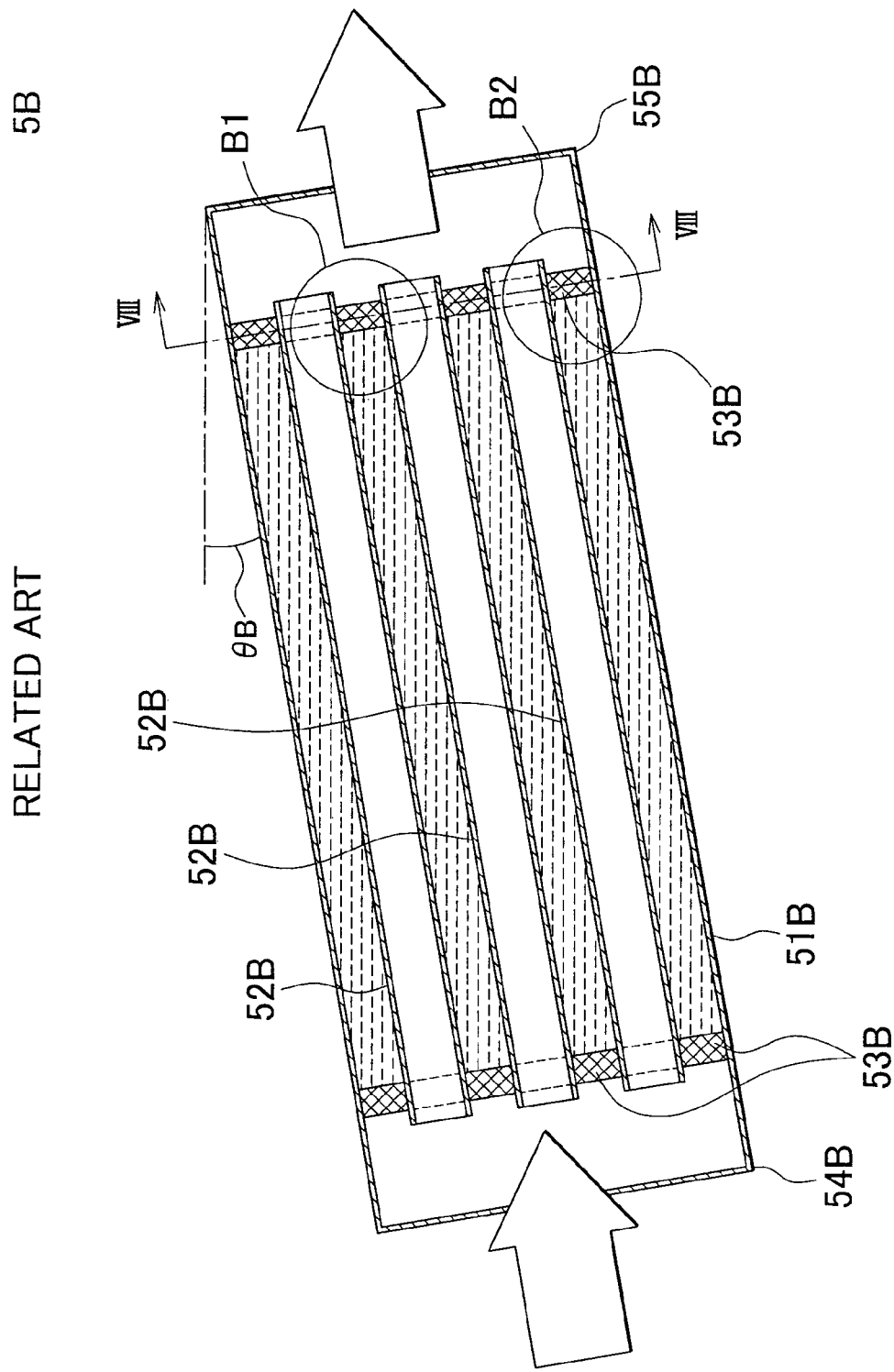
FIG. 7 is a longitudinal sectional view that illustrates one example of a conventional EGR cooler.
Figure 8:
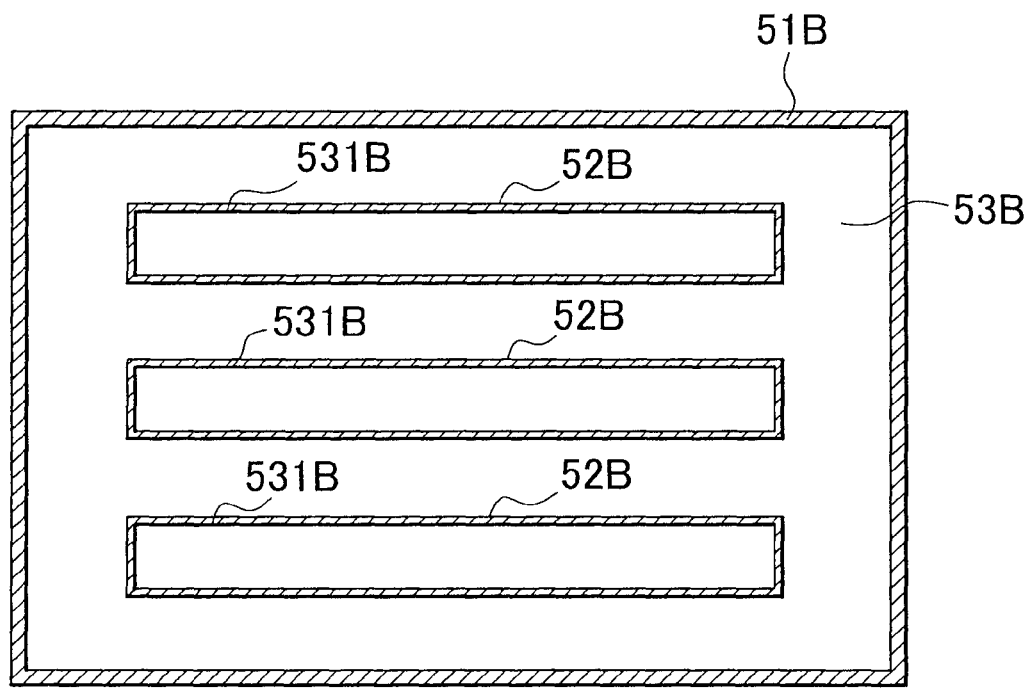
FIG. 8 is a transverse sectional view that illustrates one example of a conventional EGR cooler.

The configuration of a conventional EGR cooler 5B is next described with reference to FIG. 7 and FIG. 8. FIG. 7 is a longitudinal sectional view that illustrates one example of a conventional EGR cooler 5B. FIG. 8 is a transverse sectional view, taken along the line VIII-VIII of FIG. 7, which illustrates an example of the conventional EGR cooler 5B. The EGR cooler 5B is located in the same position as the position of the EGR cooler 5 in the internal combustion engine system 100, which is shown in FIG. 1.

As shown in FIG. 7, the EGR cooler 5B includes a shell 51B, tubes 52B, header plates 53B, a gas inflow passage 54B, and a gas outflow passage 55B. The tubes 52B, through which the exhaust gas (EGR gas) flows, are three tubular bodies each of which has a rectangular hollow cross-section in this example as shown in FIG. 7 and FIG. 8. The EGR cooler 5B is inclined at an angle θB with respect to a horizontal axis of the vehicle so that its downstream side (the right side in FIG. 7) is higher than its upstream side (the left side in FIG. 7) with respect to the flow of EGR gas through the EGR cooler 5B.

The shell 51B is a tubular body which houses the three tubes 52B and which is configured to allow a coolant to flow therethrough. For example, the coolant flows into the shell 51B through an inlet (not shown) that is formed at a lower left portion thereof in FIG. 7. The coolant flows along the outer peripheries of the three tubes 52B and then flows out of the shell 51B through an outlet (not shown) that is formed at an upper right portion thereof in FIG. 7. This flow of the coolant promotes the heat exchange between the coolant and the EGR gas that is flowing through the tubes 52B.

The header plates 53B are two plate members that are located at respective end portions in the shell 51B to prevent the coolant from flowing out of the shell 51B. The header plates 53B have support holes 531B. Both end portions of the three tubes 52B extend through the support holes 531B and thus the three tubes 52B are supported.

The gas inflow passage 54B is a passage whose one end (left end in FIG. 7) is connected to the exhaust recirculation passage 4. The exhaust gas (EGR gas), which has been discharged into the exhaust recirculation passage 4 through the exhaust manifold 22, flows into the gas inflow passage 54B. The EGR gas flows from the gas inflow passage 54B through the tubes 52B into the gas outflow passage 55B.

The gas outflow passage 55B is a passage whose one end (right end in FIG. 7) is connected to the exhaust recirculation passage 4. The EGR gas, which has passed through the tubes 52B, flows into the gas outflow passage 55B. The EGR gas then flows from the gas outflow passage 55B into the intake manifold 21 through the EGR valve 6. The shell 51B, the tubes 52B, the header plate 53B, the gas inflow passage 54B and the gas outflow passage 55B, which constitute the EGR cooler 5B, are all made of stainless steel (such as SUS304).

Figure 9A:
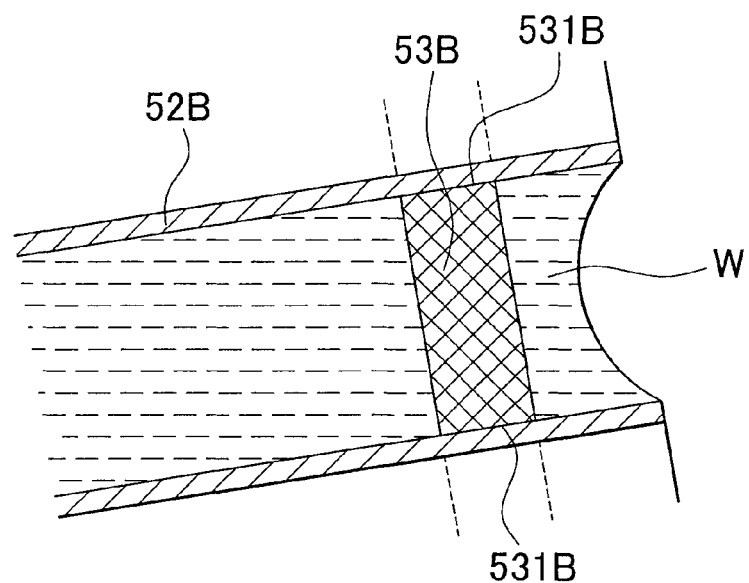
FIGS. 9A and 9B are enlarged longitudinal sectional views that illustrate the manner in which condensed water accumulates in the EGR cooler that is shown in FIG. 7 and FIG. 8.
Figure 9B:
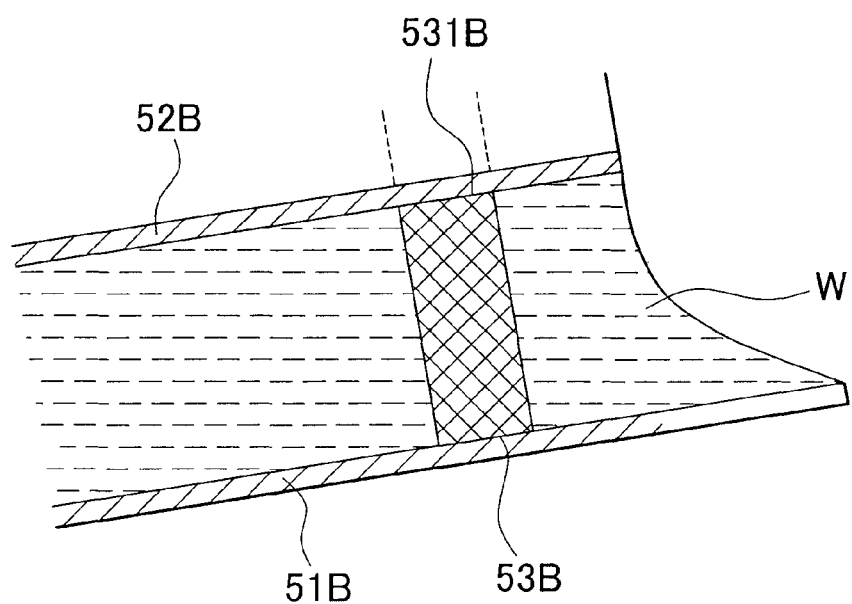

FIGS. 9A and 9B are enlarged longitudinal sectional views that illustrate the manner in which condensed water accumulates in the EGR cooler 5B that is shown in FIG. 7 and FIG. 8. FIG. 9A is an enlarged view of an area B1 in FIG. 7, and FIG. 9B is an enlarged view of an area B2 in FIG. 7. As shown in FIG. 9A, in a region between the lower surface of the upper tube 52B and the upper surface of the lower tube 52B, condensed water W may accumulate on an end face (right end face in this example) of the header plate 53B, the end face being away from the coolant. When condensed water W accumulates as described above, the tube 52B and the header plate 53B in contact with the condensed water W may be corroded.

The downstream side (the EGR valve 6-side) of the EGR cooler 5B is located higher than the upstream side (the exhaust passage-side) thereof with respect to the flow of EGR gas through the EGR cooler 5B as described above in connection with FIG. 1. Therefore, as shown in FIG. 9B, in a region between an internal surface (upper surface) of the shell 51B and the lower surface of the tube 52B located at the lowermost position, condensed water W may accumulate on the end face (i.e., the right end face in this example) of the header plate 53B, the end face being away from the coolant. When condensed water W accumulates as described above, the tube 52B, the header plate 53B and the shell 51B in contact with the condensed water W may be corroded.

(Configuration of EGR Cooler 5 According to First Embodiment of Present Invention)

Figure 2:
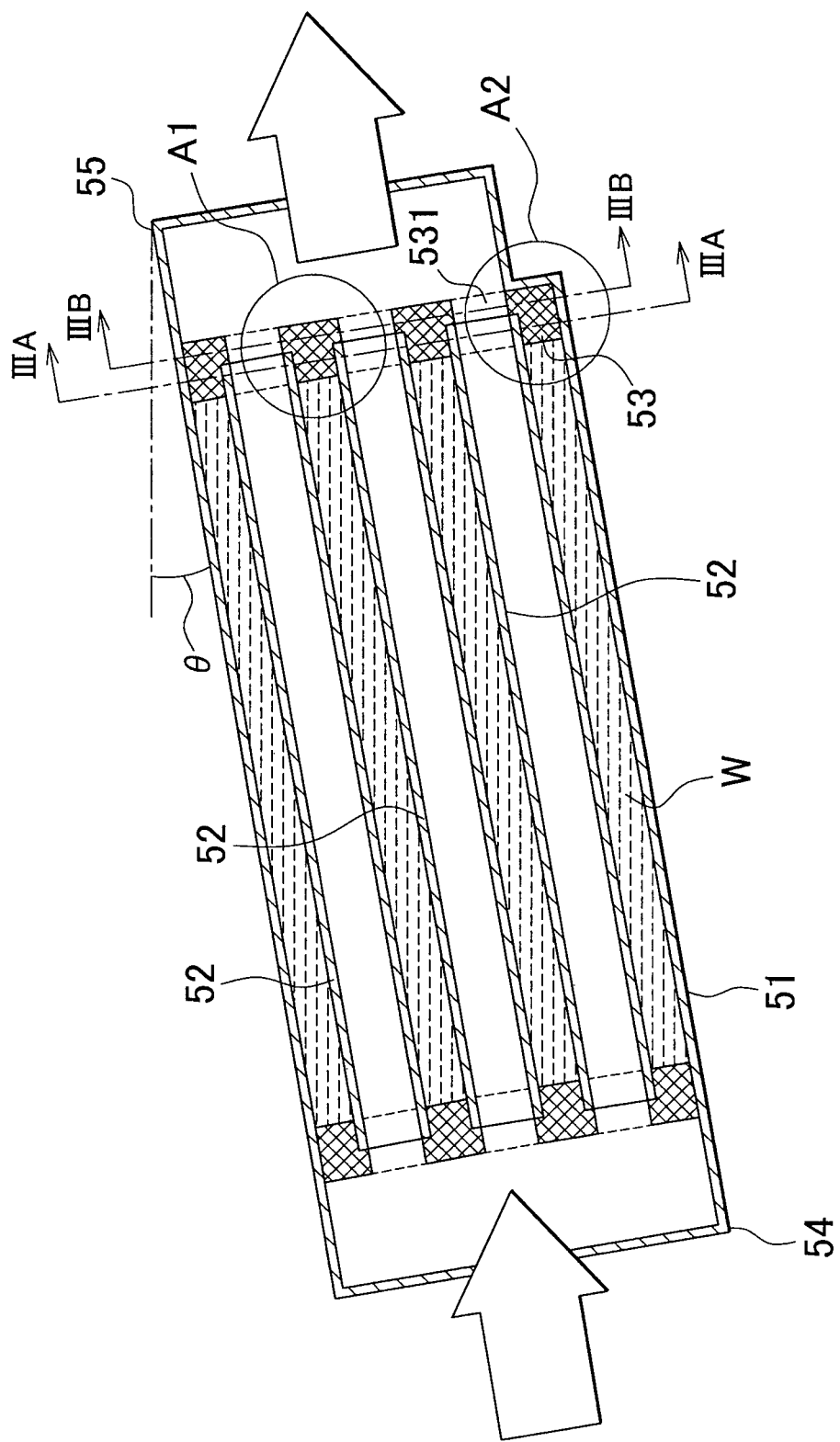
FIG. 2 is a longitudinal sectional view that illustrates one example of an EGR cooler according to a first embodiment of the present invention.
Figure 3A:
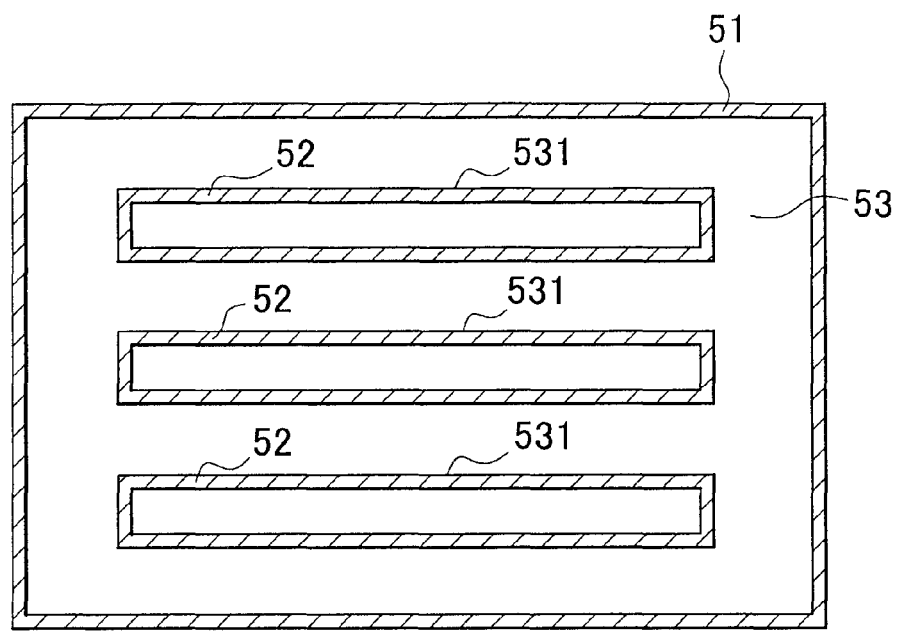
FIGS. 3A and 3B are transverse sectional views that illustrate one example of the EGR cooler that is shown in FIG. 2.
Figure 3B:
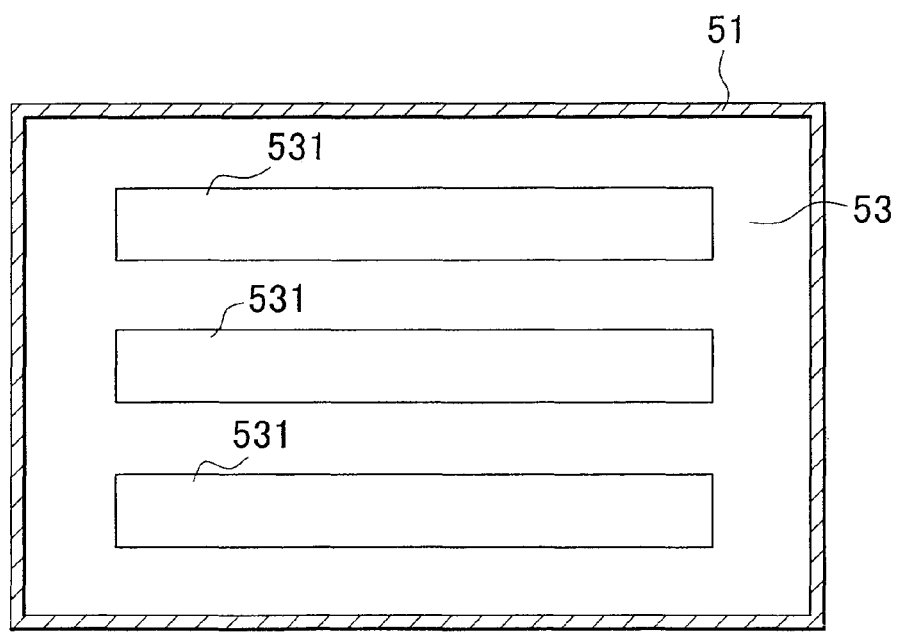

The configuration of the EGR cooler 5 according to a first embodiment of the present invention is next described with reference to FIG. 2 and FIGS. 3A and 3B. FIG. 2 is a longitudinal sectional view that illustrates one example of the EGR cooler 5 according to the first embodiment of the present invention. FIGS. 3A and 3B are transverse sectional views, taken along the line IIIA-IIIA and IIIB-IIIB of FIG. 2, respectively, which illustrate an example of the EGR cooler 5 that is shown in FIG. 2.

As shown in FIG. 2, the EGR cooler 5 includes a shell 51, tubes 52, header plates 53, a gas inflow passage 54, and a gas outflow passage 55. The tubes 52, through which the exhaust gas (EGR gas) flows, are tubular bodies each of which has a flat rectangular cross-section in this example as shown in FIG. 2 and FIGS. 3A and 3B. The EGR cooler 5 is inclined at an angle θ with respect to a horizontal axis of the vehicle so that its downstream side (the right side in FIG. 2) is higher than its upstream side (the left side in FIG. 2) with respect to the flow of EGR gas through the EGR cooler 5.

The shell 51 is a tubular body with a rectangular hollow cross-section which houses the three tubes 52 and which is configured to allow the coolant to flow therethrough. For example, the coolant flows into the shell 51 through an inlet (not shown) that is formed at a lower left portion thereof in FIG. 2. The coolant flows along the outer peripheries of the three tubes 52 and then flows out of the shell 51 through an outlet (not shown) that is formed at an upper right portion thereof in FIG. 2. This flow of the coolant promotes the heat exchange between the coolant and the EGR gas that is flowing through the tubes 52.

While the three tubes 52 are housed in the shell 51 in this embodiment, the number of the tubes 52 is not limited as long as at least two tubes 52 are housed in the shell 51. For example, two tubes 52 may be housed in the shell 51, or four or more tubes 52 may be housed in the shell 51.

While the shell 51 and the tubes 52 are tubular bodies each of which has a flat rectangular cross-section in this embodiment, at least either the shell 51 or the tubes 52 may have a circular cross-section.

The header plates 53 are two plate members that are located at respective end portions in the shell 51 to prevent the coolant from flowing out of the shell 51. The header plates 53 have support holes 531 in which both end portions of the three tubes 52 are fitted and supported. Each of axial end faces of the three tubes 52 is located in the corresponding support hole 531 at a position between both ends of the header plate 53 in the thickness direction of the header plate 53 (refer to FIG. 4A).

The gas inflow passage 54 is a passage whose one end (left end in FIG. 2) is connected to the exhaust recirculation passage 4. The exhaust gas (EGR gas), which has been discharged into the exhaust recirculation passage 4 through the exhaust manifold 22, flows into the gas inflow passage 54. The EGR gas flows from the gas inflow passage 54 through the tubes 52 into the gas outflow passage 55.

The gas outflow passage 55 is a passage whose one end (right end in FIG. 2) is connected to the exhaust recirculation passage 4. The EGR gas, which has passed through the tubes 52, flows into the gas outflow passage 55. The EGR gas then flows from the gas outflow passage 55 into the intake manifold 21 through the EGR valve 6. In this embodiment, the gas inflow passage 54 and the gas outflow passage 55 are integrated with the shell 51 by, for example, welding. The shell 51, the tubes 52, the header plates 53, the gas inflow passage 54 and the gas outflow passage 55, which constitute the EGR cooler 5, are all made of aluminum or a resin, for example.

Because the header plates 53 are made of aluminum or a resin as described above, the thickness of the header plates 53 can be made greater (for example, 3 mm) than that in the conventional EGR cooler 5B (refer to FIG. 7 to FIGS. 9A and 9B). Thus, movement restricting portions 532 (refer to FIGS. 4A and 4B) can be formed easily.

In other words, because the conventional header plates 53 are made of stainless steel (such as SUS304), their thickness cannot be increased because of weight limitation. In contrast, because the header plates 53 are made of aluminum or a resin, the movement restricting portions 532 can be formed easily because the thickness of the header plates 53 can be increased (to 3 mm, for example).

While the header plates 53 are made of aluminum or a resin in this embodiment, the header plates 53 may be made of another material such as an aluminum alloy. In other words, the header plates 53 may be made of any heat-resistant and corrosion-resistant material with a lower specific gravity than that of stainless steel (for example, SUS304).

Figure 4A:
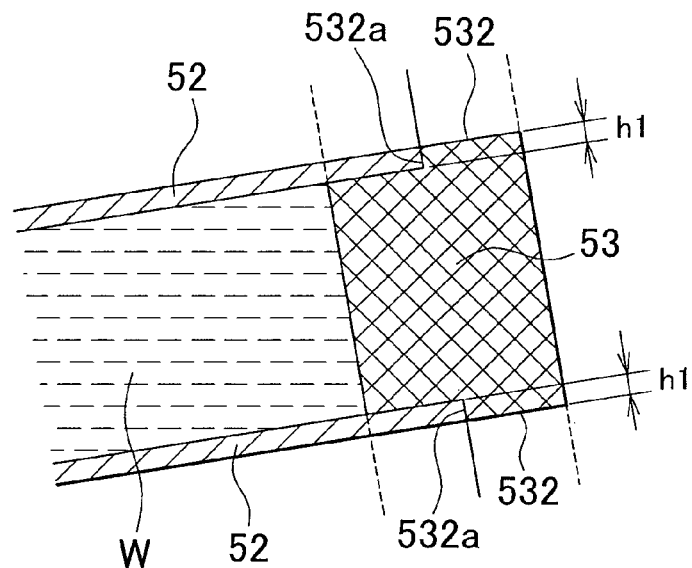
FIGS. 4A and 4B are enlarged longitudinal sectional views that illustrate one example of a characteristic configuration of the EGR cooler that is shown in FIG. 2.
Figure 4B:
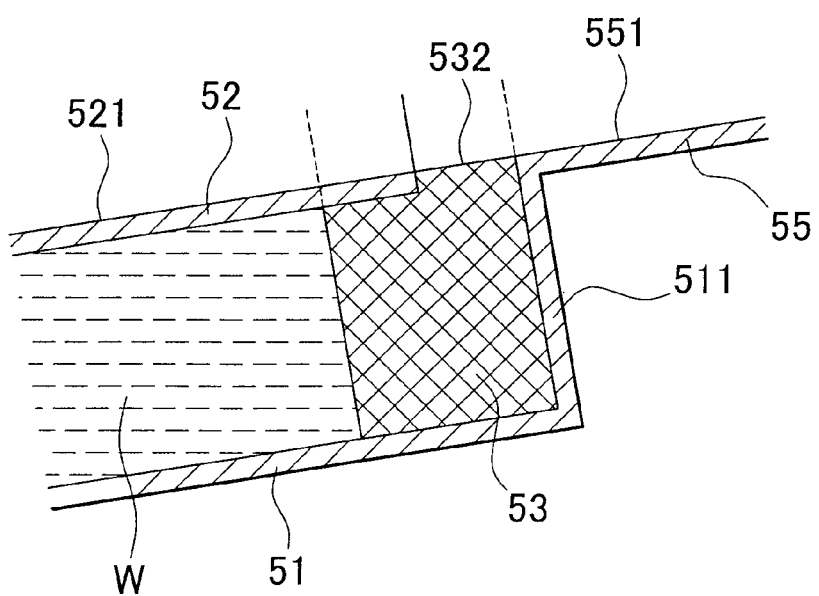

FIGS. 4A and 4B are enlarged longitudinal sectional views that illustrate one example of a characteristic configuration of the EGR cooler 5 that is shown in FIG. 2. FIG. 4A is an enlarged view of an area A1 in FIG. 2, and FIG. 4B is an enlarged view of an area A2 in FIG. 2. As shown in FIG. 2, each of the axial end faces of the plurality of (three in this example) tubes 52 is located in the corresponding support hole 531 at a position between the both ends of the header plate 53 in the thickness direction of the header plate 53. In this example, each of the axial end faces of the tubes 52 is located at substantially the center of the header plate 53 in the thickness direction of the header plate 53 (the right-left direction in FIG. 4A), as shown in FIG. 4A.

Because each of the axial end faces of the three tubes 52 is located in the corresponding support hole 531 at a position between the both ends of the header plate 53 in the thickness direction of the header plate 53 (at substantially the center of the header plate 53 in the thickness direction of the header plate 53 in this example), each of the axial end faces of the tubes 52 does not protrude from the corresponding support hole 531 of the header plate 53. Thus, condensed water is prevented from accumulating between the outer peripheral surfaces of the tubes 52 (refer to FIG. 9A).

While each of the axial end faces of the tubes 52 is located at substantially the center of the header plate 53 in the thickness direction of the header plate 53 in this embodiment, each of the axial end faces of the tubes 52 may be located at any position between the both ends of the header plate 53 in the thickness direction of the header plate 53. However, to prevent the tubes 52 from falling out of the support holes 531 of the header plates 53 due to vibration of the EGR cooler 5 caused by vibration of the vehicle or thermal expansion or contraction of the EGR cooler 5, each of the axial end faces of the tubes 52 is preferably inserted deeply into the corresponding support hole 531 of the header plate 53 (to the vicinity of the right end face of the header plate 53 in FIG. 4A).

As shown in FIG. 4A, each header plate 53 includes the movement restricting portions 532 which contact the axial end faces of the tubes 52 to restrict the tubes 52 from moving axially. Specifically, each movement, restricting portion 532 is constituted by a wall member that extends in a direction perpendicular to the thickness direction of the header plate 53, in the corresponding support hole 531. The wall member (in other words, the movement restricting portion 532), which extends in the direction perpendicular to the thickness direction of the header plate 53 in the corresponding support hole 531, has a tube 52-side end face 532a which contacts the tube 52 to restrict the tube 52 from moving axially. The movement restricting portion 532 has a height h1 in the direction perpendicular to the thickness direction of the header plate 53, the height h1 being equivalent to the thickness of the tube 52.

Because each movement restricting portion 532 is constituted by the wall member that extends in the direction perpendicular to the thickness direction of the header plate 53 (a top-bottom direction in FIG. 4A) in the corresponding support hole 531 as described above, the plurality of (three in this example) tubes 52 can be reliably prevented from moving axially (in the right-left direction in FIG. 4A) with the simple structure.

While the movement restricting portion 532 is constituted by the wall member in this embodiment, the movement restricting portion 532 may be in a different form. For example, the movement restricting portion 532 may be a hemispherical (or quadrangular pyramid-shaped) protrusion that protrudes in the direction perpendicular to the thickness direction of the header plate 53. A plurality of (four, for example) the protrusions may be arranged along the peripheral surface of the support hole 531.

In addition, because the movement restricting portion 532 has the height h1 in the direction perpendicular to the thickness direction of the header plate 32 (the top-bottom direction in FIG. 4A), the height h1 being equivalent to the thickness of the tube 52, the inner peripheral surface of the movement restricting portion 532 is flush with the inner peripheral surface of the tube 52. Thus, condensed water is prevented from accumulating between the movement restricting portion 532 and the tube 52.

While the movement restricting portion 532 is constituted by the wall member which has the height h1 equivalent to the thickness of the tube 52 in this embodiment, the movement restricting portion 532 may be constituted by the wall member which has the height h1 greater (or smaller) than the thickness of the tube 52. In this case, the inner peripheral surface of the movement restricting portion 532 and the inner peripheral surface of the tube 52 are not flush with each other, that is, there is a step (an uneven portion) between the inner peripheral surface of the movement restricting portion 532 and the inner peripheral surface of the tube 52. However, condensed water is unlikely to accumulate in a region between the inner peripheral surface of the movement restricting portion 532 and the inner peripheral surface of the tube 52 because the region is a part of the passage for the EGR gas. Even if condensed water accumulates, the condensed water is vaporized in a short period of time by the EGR gas and unlikely to cause corrosion.

As shown in FIG. 4B, the shell 51 is bent (at a right angle in this example) at a lower end portion in the higher side of the shell 51 (the right side in FIG. 4B) to extend (upward in this example) along an end face (the right end face in FIG. 4B) of the header plate 53, the end face being away from the tubes 52.

Because the shell 51 is inclined with respect to the horizontal axis of the vehicle and because the shell 51 is bent (at a right angle in this example) at the lower end portion in the higher side of the shell 51 (the right side in FIG. 4B) to extend (upward in this example) along the end face (the right end face in FIG. 4B) of the header plate 53, the end face being away from the tubes 52 as described above, condensed water which is generated when the exhaust gas is cooled in the EGR cooler 5 is prevented from accumulating at the end portion of the header plate 53.

In other words, the condensed water in the gas outflow passage 55 flows through the tube 52 at the lowermost position among the plurality of (three in this example) tubes 52 to the lower end portion in the lower side of the shell 51 (the left side in this example) and is vaporized upon exposure to the exhaust gas (EGR gas). Thus, condensed water is prevented from accumulating between the shell 51 and the end face of the header plate 53, the end face being away from the plurality of (three in this example) tubes 52 (refer to FIG. 9B).

While the shell 51 is bent at the lower end portion in the higher side of the shell 51 (the right side in FIG. 4B) to extend along the end face (the right end face in FIG. 4B) of the header plate 53, the end face being away from the tubes 52 in this embodiment, the shell 51 and the lower end portion of the header plate 53 in the higher side (the right side in FIG. 4) may be formed integrally. In this case, the structure of the EGR cooler 5 can be simplified.

In addition, the shell 51 is bent such that the position of an upper surface 521 of a lower part of the tube 52 located at the lowermost position among the plurality of (three in this example) tubes 52 coincides with the position of an internal surface 551 of the shell 51 in the top-bottom direction (i.e., the top-bottom direction of the shell 51).

Because the shell 51 is bent (at a right angle in this example) to extend (rightward in this example) such that the position of the upper surface 521 of the lower part of the tube 52 located at the lowermost position among the plurality of (three in this example) tubes 52 coincides with the position of the internal surface 551 of the shell 51 (the gas outflow passage 55 in this example), in the top-bottom direction, as described above, the flow of the exhaust gas (EGR gas) through the tube 52 is prevented from being interfered with by the shell 51 and the gas outflow passage 55.

While the upper surface 521 of the lower part of the tube 52 located at the lowermost position, the internal surface of the corresponding movement restricting portion 532 of the header plate 53, and the internal surface 551 of the gas outflow passage 55 are flush with each other in this embodiment, the upper surface 521 of the lower part of the tube 52 located at the lowermost position, the internal surface of the corresponding movement restricting portion 532 of the header plate 53 and the internal surface 551 of the gas outflow passage 55 may not be flush with each other, that is, there may be a step(s) among the upper surface 521 of the lower part of the tube 52 located at the lowermost position, the internal surface of the corresponding movement restricting portion 532 of the header plate 53 and the internal surface 551 of the gas outflow passage 55. In this case, however, it is preferable that a member closer to the exhaust gas exit side (the right side of FIG. 4B) is located at a higher position. In this case, even if condensed water is generated at the step(s), the condensed water flows to the exhaust gas entry side (the left side in FIG. 4B) due to the inclination of the EGR cooler 5, and the condensed water is vaporized by the heat from the exhaust gas. Thus, the condensed water is very unlikely to cause corrosion.

(Configuration of EGR Cooler 5A According to Second Embodiment of Present Invention)

Figure 5:
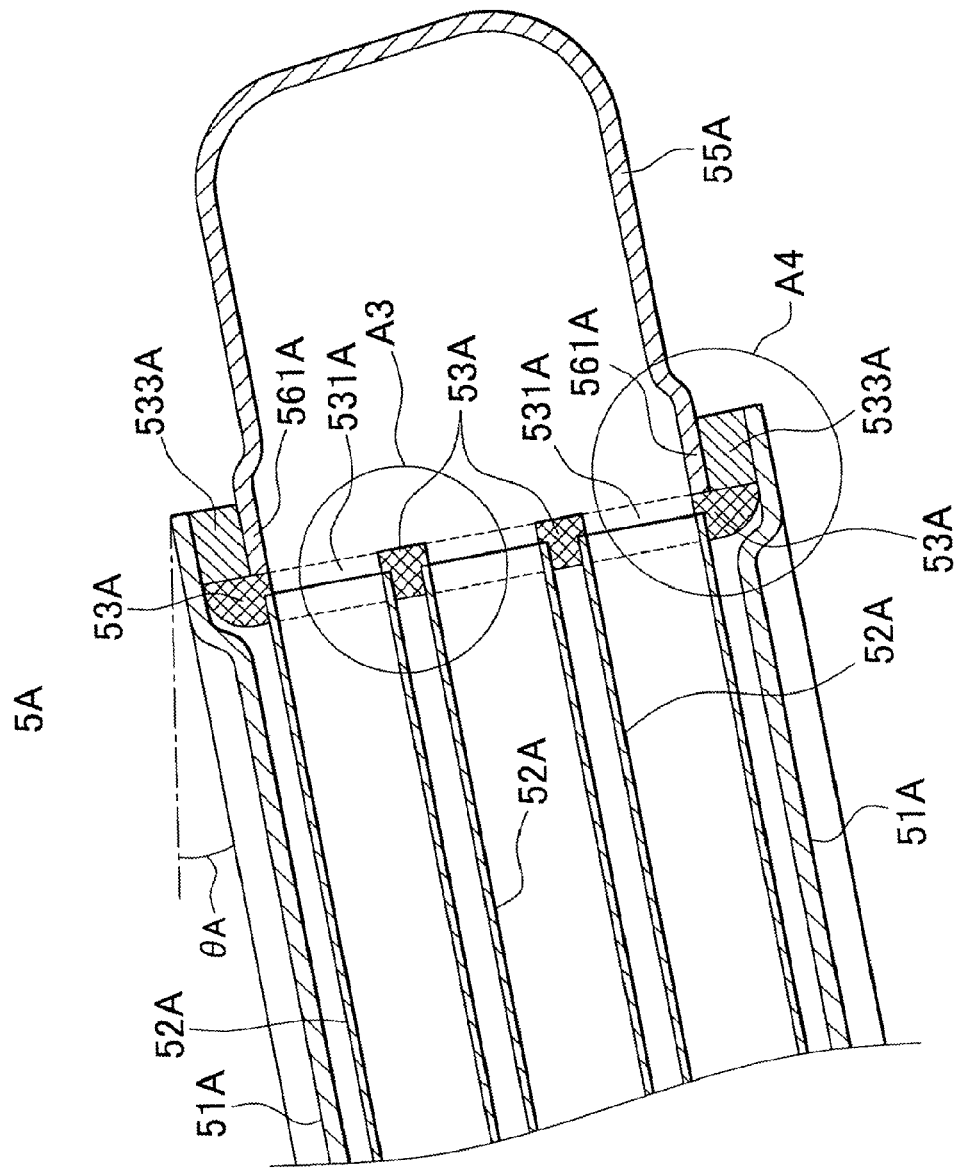
FIG. 5 is a longitudinal sectional view that illustrates an EGR cooler according to a second embodiment of the present invention.

The configuration of an EGR cooler 5A according to a second embodiment of the present invention is next described with reference to FIG. 5. FIG. 5 is a longitudinal sectional view that illustrates one example of the EGR cooler 5A according to the second embodiment of the present invention.

As shown in FIG. 5, the EGR cooler 5A according to the second embodiment includes a shell 51A, tubes 52A, header plates 53A, and a gas outflow passage 55A as in the case with the EGR cooler 5 in the first embodiment. The gas outflow passage 55A may be regarded as the "exhaust pipe" according to the present invention. In the following description, the differences in configuration between the EGR cooler 5A according to the second embodiment and the EGR cooler 5 according to the first embodiment are described in detail, and their common portions are described in brief. The EGR cooler 5A is inclined at an angle θA with respect to the horizontal axis of the vehicle so that its downstream side (the right side in FIG. 5) is higher than its upstream side (the left side in FIG. 5) with respect to the flow of EGR gas through the EGR cooler 5A.

Figure 6A:
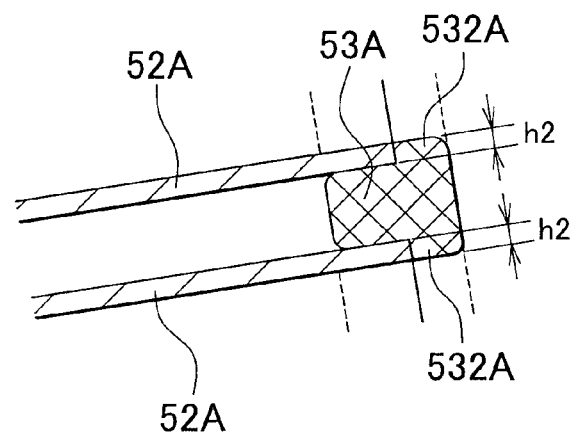
FIGS. 6A and 6B are enlarged longitudinal sectional views that illustrate one example of a characteristic configuration of the EGR cooler that is shown in FIG. 5.
Figure 6B:
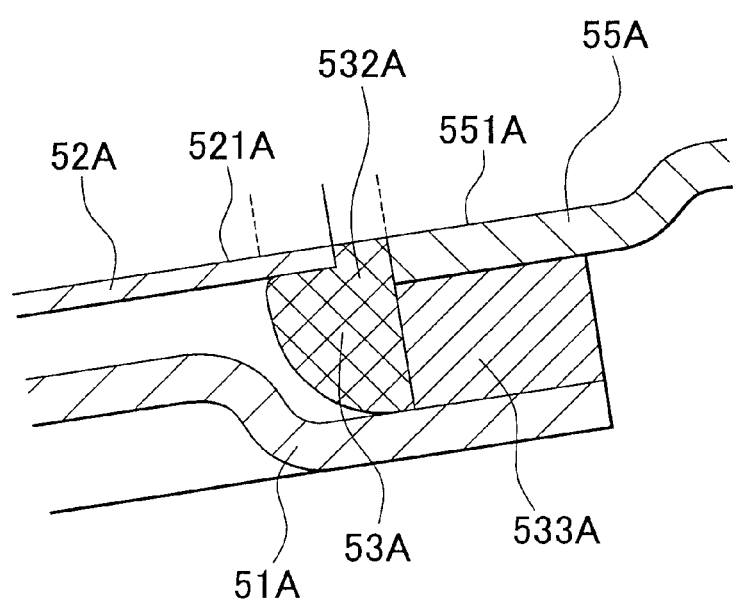

First, the common portions of the EGR cooler 5A according to the second embodiment and the EGR cooler 5 according to the first embodiment are described briefly with reference to FIG. 6A. FIGS. 6A and 6B are enlarged longitudinal sectional views that illustrate one example of a characteristic configuration of the EGR cooler 5A that is shown in FIG. 5. FIG. 6A is an enlarged view of an area A3 in FIG. 5, and FIG. 6B is an enlarged view of an area A4 in FIG. 5. As shown in FIG. 6A, each of axial end faces of the plurality of (three in this example) tubes 52A is located in a corresponding support hole 531A at a position between both ends of the header plate 53A in the thickness direction of the header plate 53A as in the EGR cooler 5 according to the first embodiment. In this example, each of the axial end faces of the tubes 52A is located at substantially the center of the header plate 53A in the thickness direction of the header plate 53A (the right-left direction in FIG. 6A).

As shown in FIG. 6A, each header plate 53A includes movement restricting portions 532A which contact the axial end faces of the plurality of (three in this example) tubes 52A to restrict the plurality of (three in this example) tubes 52A from moving axially as in the EGR cooler 5 according to the first embodiment. Specifically, each movement restricting portion 532A is constituted by a wall member that extends in a direction perpendicular to the thickness direction of the header plate 53A, in the corresponding support hole 531A. The movement restricting portion 532A has a height h2 in the direction perpendicular to the thickness direction of the header plate 53A, the height h2 being equivalent to the thickness of the tube 52A as in the EGR cooler 5 according to the first embodiment.

The difference in configuration between the EGR cooler 5A according to the second embodiment and the EGR cooler 5 according to the first embodiment is described with reference to FIG. 5 and FIG. 6B. Whereas the gas outflow passage 55 is integrated with the shell 51 by welding, for example (refer to FIG. 2), in the EGR cooler 5 according to the first embodiment as shown in FIG. 5, a tube 52A-side end portion (left end portion in this example) 561A of the gas outflow passage 55A, which is located on a side of the tubes 52, is fitted in and, fixed in an extended portion 533A of the header plate 53A in the EGR cooler 5A according to the second embodiment.

The header plate 53A includes the tubular extended portion 533A that extends from the outer peripheral portion of the header plate 53A toward a side away from the tubes 52A (in other words, in a direction away from the tubes 52A, that is, rightward in FIG. 5 in this example). In other words, the extended portion 533A protrudes in a tubular form from the outer peripheral portion of the header plate 53A toward the gas outflow passage 55A (rightward in FIG. 5 in this example). The header plate 53A and the extended portion 533A are formed integrally with each other. However, the header plate 53A may not be formed integrally with the extended portion 533A.

The tube 52A-side end portion (left end portion in this example) 561A of the gas outflow passage 55A is fitted in and fixed in the extended portion 533A of the header plate 53A as described above.

Thus, the shell 51A is inclined with respect to the horizontal axis of the vehicle, and includes the tubular gas outflow passage 55A which is located at the end portion at the higher side of the shell 51A, and through which the exhaust gas flows. The header plate 53A, includes the tubular extended portion 533A that extends from the outer peripheral portion of the header plate 53A toward the side away from the tubes 52A, and the tube 52A-side end portion (left end portion in FIG. 5 and FIG. 6B) 561A of the gas outflow passage 55A is fitted in and fixed in the extended portion 533A. Therefore, condensed water which is generated when the exhaust gas is cooled in the EGR cooler 5A is prevented from accumulating at the end portion of the header plate 53A.

In other words, condensed water which is generated when the exhaust gas is cooled in the EGR cooler 5A is prevented from accumulating at the end portion of the header plate 53A because the condensed water is exposed to the exhaust gas and vaporized while it is flowing toward the lower end portion of the exhaust gas inflow passage (not shown) through the tube 52A located at the lowermost position among the plurality of (three in this example) tubes 52A.

While the extended portion 533A is formed integrally with the header plate 53A in this embodiment, the extended portion 533A may be formed integrally with the shell 51A or the gas outflow passage 55A.

The gas outflow passage 55A is disposed such that the position of an upper surface 551A of a lower part of the gas outflow passage 55A coincides with the position of an upper surface 521A of a lower part of the tube 52A located at the lowermost position among the plurality of (three in this example) tubes 52A, in the top-bottom direction (i.e., the top-bottom direction of the shell 51A), as shown in FIG. 6B.

Because the gas outflow passage 55A is disposed such that the position of the upper surface 551A of the lower part of the gas outflow passage 55A coincides with the position of the upper surface 521A of the lower part of the tube 52A located at the lowermost position among the plurality of (three in this example) tubes 52A, in the top-bottom direction, as described above, the flow of exhaust gas through the tube 52A is prevented from being interfered with by the gas outflow passage 55A. In addition, condensed water is prevented from accumulating between the upper surface 551A of the lower part of the gas outflow passage 55A and the upper surface 521A of the lower part of the tube 52A located at the lowermost position among the plurality of (three in this example) tubes 52A.

In other words, because the upper surface 521A of the lower part of the tube 52A located at the lowermost position, an internal surface of the corresponding movement restricting portion 532A of the header plate 53A, and the upper surface 551A of the lower part of the gas outflow passage 55A are substantially flush with each other as shown in FIG. 6B, the condensed water which is generated when the exhaust gas is cooled in the EGR cooler 5A does not accumulate between the internal surface of the movement restricting portion 532A of the header plate 53A and the upper surface 551A of the lower part of the gas outflow passage 55A, and the condensed water flows into the tube 52A located at the lowermost position.

While the upper surface 521A of the lower part of the tube 52A located at the lowermost position, the internal surface of the corresponding movement restricting portion 532A of the header plate 53A and the upper surface 551A of the lower part of the gas outflow passage 55A are flush with each other in this embodiment, the upper surface 521A of the lower part of the tube 52A located at the lowermost position, the internal surface of the corresponding movement restricting portion 532A of the header plate 53A and the upper surface 551A of the lower part of the gas outflow passage 55A may not be flush with each other, that is, there may be a step(s) among the upper surface 521A of the lower part of the tube 52A located at the lowermost position, the internal surface of the corresponding movement restricting portion 532A of the header plate 53A and the upper surface 551A of the lower part of the gas outflow passage 55A. In this case, however, it is preferable that a member closer to the exhaust gas exit side (the right side in FIG. 6B) is located at a higher position. In this case, even if condensed water is generated at the step(s), the condensed water flows to the exhaust gas entry side (the left side in FIG. 6B) due to the inclination of the EGR cooler 5A and the condensed water is vaporized by the heat from the exhaust gas. Thus, the condensed water is very unlikely to cause corrosion.

OTHER EMBODIMENTS

While the exhaust gas cooling device is the EGR cooler in the first and second embodiments, the exhaust gas cooling device may be any device that cools exhaust gas from an internal combustion engine mounted on a vehicle through heat exchange between the exhaust gas and a coolant. For example, the exhaust gas cooling device may be a heat recovery device which recovers heat from the exhaust gas.

While the downstream side (the EGR valve 6-side) of the EGR cooler 5 or 5A is higher than the upstream side (exhaust passage-side) thereof with respect to the flow of EGR gas through the EGR cooler 5 or 5A in each of the first and second embodiments, the downstream side (the EGR valve 6-side) may be lower than the upstream side (exhaust passage-side).

The present invention is applicable to an exhaust gas cooling device which cools exhaust gas from an internal combustion engine mounted on a vehicle through heat exchange between the exhaust gas and a coolant. In particular, the present invention is applicable to an EGR cooler.

The invention claimed is:

1. An exhaust gas cooling device which cools exhaust gas from an internal combustion engine mounted on a vehicle through heat exchange between the exhaust gas and a coolant, comprising:
a plurality of tubes through which the exhaust gas flows;
a tubular shell which houses the plurality of tubes and is configured to allow the coolant to flow therethrough; and
a header plate disposed at an end portion in the shell to prevent the coolant from flowing out of the shell,
wherein the header plate includes support holes in which end portions of the plurality of the tubes are fitted and supported, and each of axial end faces of the plurality of tubes is located in the corresponding support hole at a position between both ends of the header plate in a thickness direction of the header plate,
wherein the header plate includes movement restricting portions which contact the axial end faces of the plurality of tubes to restrict the plurality of tubes from moving axially,
wherein each of the movement restricting portions is constituted by a wall member that extends in a direction perpendicular to the thickness direction of the header plate, in the corresponding support hole, and
wherein each of the movement restricting portions has a height in the direction perpendicular to the thickness direction of the header plate, the height being equivalent to a thickness of each of the tubes.

2. The exhaust gas cooling device according to claim 1, wherein each of the axial end faces of the plurality of tubes is located at substantially a center of the header plate in the thickness direction of the header plate.

3. The exhaust gas cooling device according to claim 1, wherein the shell is inclined with respect to a horizontal axis of the vehicle, and the shell is bent at a lower end portion in a higher side of the shell to extend along an end face of the header plate, the end face being away from the tubes.

4. The exhaust gas cooling device according to claim 3, wherein the shell is bent such that a position of an upper surface of a lower part of the tube located at a lowermost position among the plurality of tubes substantially coincides with a position of an internal surface of the shell.

5. The exhaust gas cooling device according to claim 1, wherein the shell is inclined with respect to a horizontal axis of the vehicle, and the shell includes a tubular exhaust pipe which is provided at an end portion in a higher side of the shell, and through which the exhaust gas flows, and wherein the header plate includes a tubular extended portion that extends from an outer peripheral portion of the header plate toward a side away from the tubes, and an end portion of the exhaust pipe, which is located on a side of the tubes, is fitted in and fixed in the extended portion.

6. The exhaust gas cooling device according to claim 5, wherein the tubular exhaust pipe is disposed such that a position of an upper surface of a lower part of the tubular exhaust pipe substantially coincides with a position of an upper surface of a lower part of the tube located at a lowermost position among the plurality of tubes, in a top bottom direction.

7. The exhaust gas cooling device according to claim 1, wherein the header plate is made of aluminum or a resin.

8. An exhaust gas cooling device which cools exhaust gas from an internal combustion engine mounted on a vehicle through heat exchange between the exhaust gas and a coolant, comprising:
a plurality of tubes through which the exhaust gas flows;
a tubular shell which houses the plurality of tubes and is configured to allow the coolant to flow therethrough; and
a header plate disposed at an end portion in the shell to prevent the coolant from flowing out of the shell, wherein the header plate includes support holes in which end portions of the plurality of the tubes are fitted and supported, and each of axial end faces of the plurality of tubes is located in the corresponding support hole at a position between both ends of the header plate in a thickness direction of the header plate, wherein the header plate includes movement restricting portions which contact the axial end faces of the plurality of tubes to restrict the plurality of tubes from moving axially, wherein each of the movement restricting portions protrudes from an inner surface of the support hole of the header plate, and wherein each of the movement restriction portions has a height from the inner surface of the support hole of the header plate, the height being equivalent to a thickness of each of the tubes.

* * * * *